No. 786,081. PATENTED MAR. 28, 1905.
A. G. WITEK.
WEIGHING MACHINE.
APPLICATION FILED JULY 20, 1904.

3 SHEETS—SHEET 1.

WITNESSES:
Robert Stead
H. R. Murdock.

INVENTOR:
Anthony G. Witek

No. 786,081. PATENTED MAR. 28, 1905.
A. G. WITEK.
WEIGHING MACHINE.
APPLICATION FILED JULY 20, 1904.

3 SHEETS—SHEET 2.

WITNESSES:
Robert Head
H. L. Murdock.

INVENTOR:
Anthony G. Witek

No. 786,081. PATENTED MAR. 28, 1905.
A. G. WITEK.
WEIGHING MACHINE.
APPLICATION FILED JULY 20, 1904.
3 SHEETS—SHEET 3.
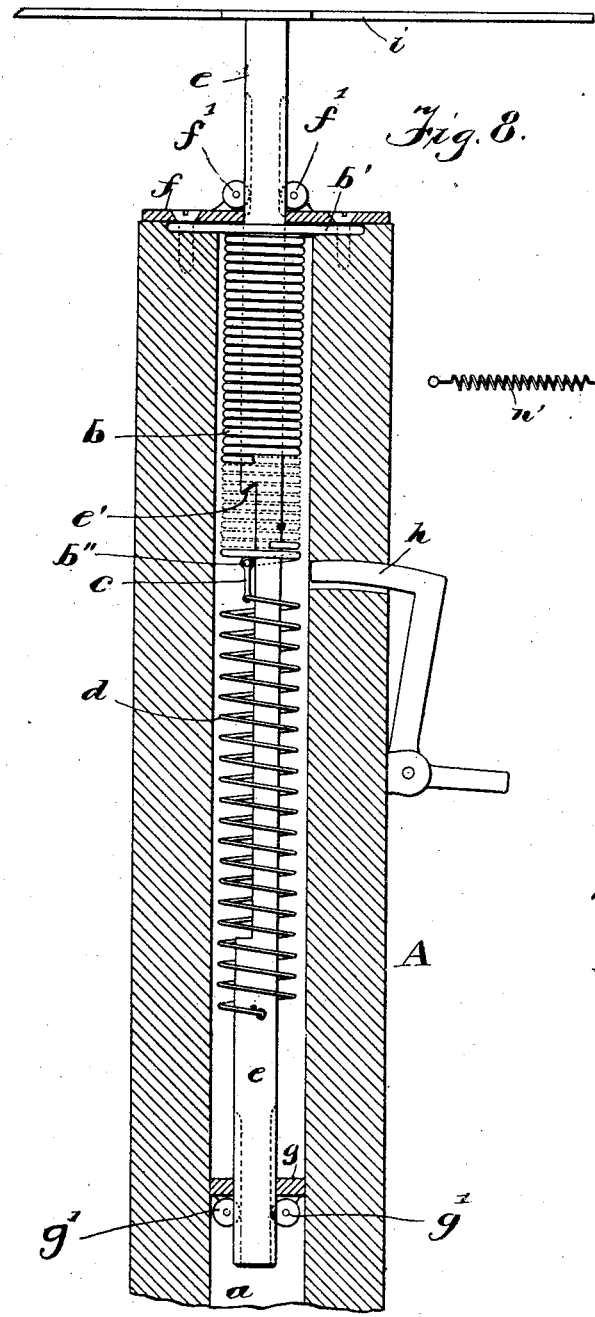
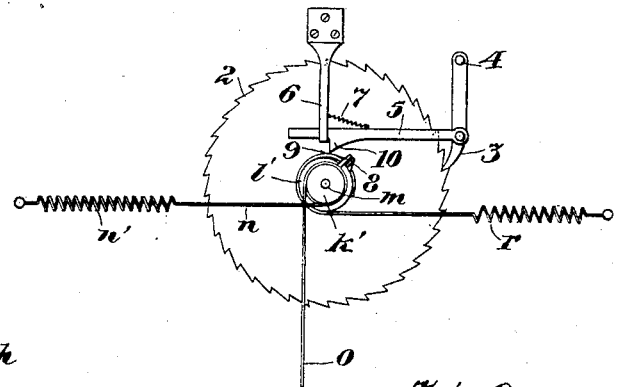
Fig. 9.
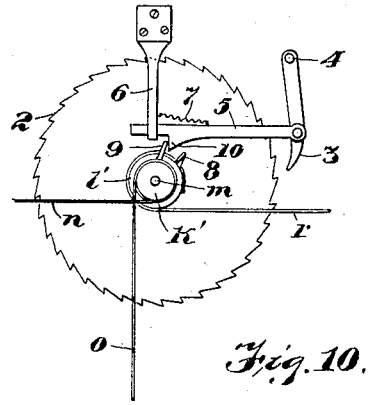
Fig. 10.
WITNESSES:
Robert Head
H. L. Murdock
INVENTOR:
Anthony G. Witek.

No. 786,081. Patented March 28, 1905.

UNITED STATES PATENT OFFICE.

ANTHONY G. WITEK, OF NEW YORK, N. Y., ASSIGNOR OF ONE-FIFTH TO JOHN T. WITEK, OF NEW YORK, N. Y.

WEIGHING-MACHINE.

SPECIFICATION forming part of Letters Patent No. 786,081, dated March 28, 1905.

Application filed July 20, 1904. Serial No. 217,304.

*To all whom it may concern:*

Be it known that I, ANTHONY G. WITEK, a citizen of the United States, and a resident of the city of New York, borough of Manhattan, in the county and State of New York, have invented a new and Improved Weighing-Machine, of which the following is a full, clear, and exact specification.

My invention relates to spring-balance weighing-machines, and has for its object to provide a novel, safe, and accurate method of ascertaining the weight of human beings or other bodies, objects, and substances of various kinds.

A further object is to provide a weighing device that may be used as an article of furniture—such, for instance, as a chair or table—without detracting or departing from the general character of such articles of household furniture.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
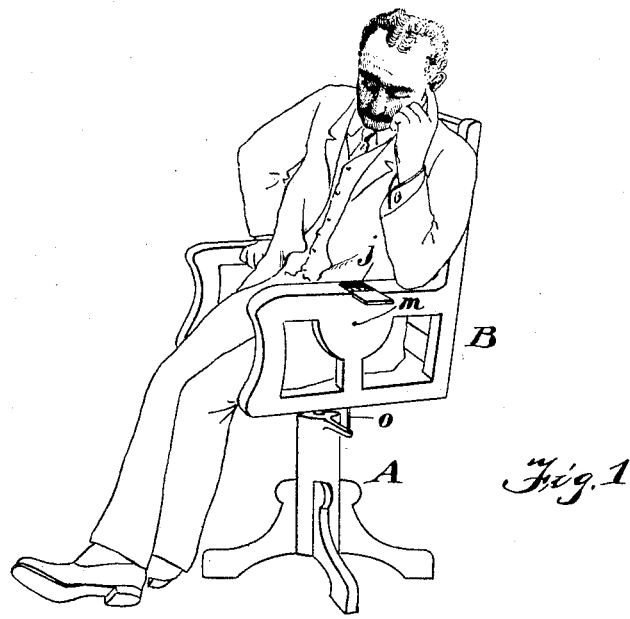
Figure 2:
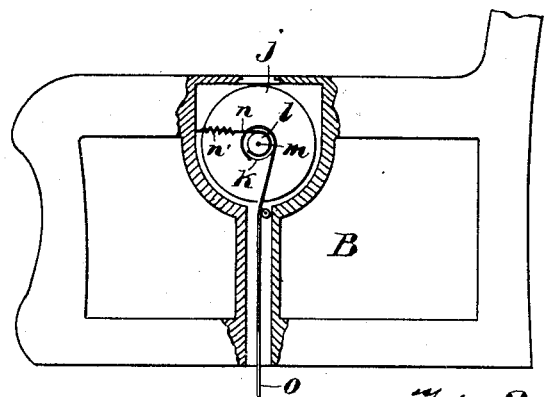
Figure 3:
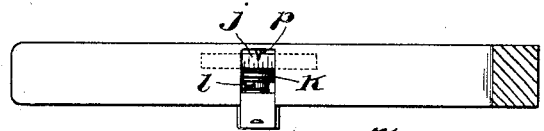
Figure 4:
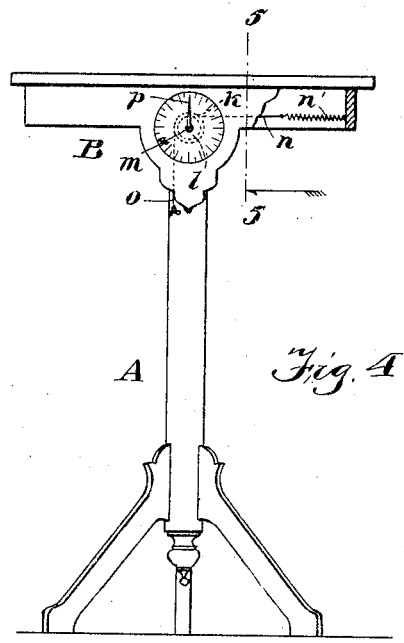
Figure 5:
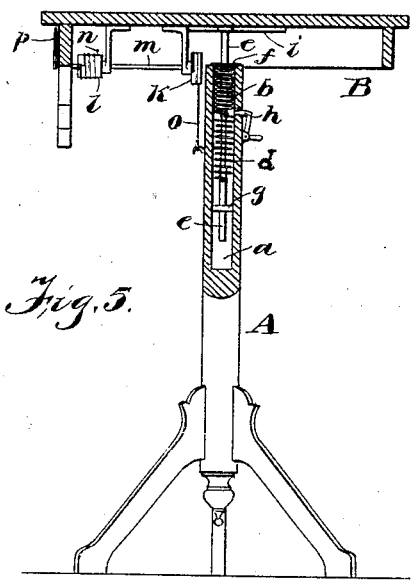
Figure 6:
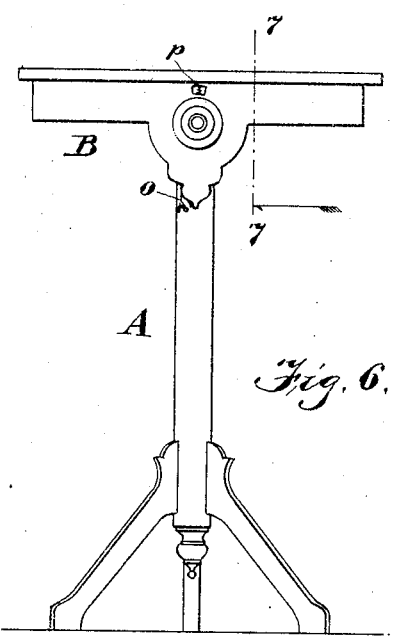
Figure 7:
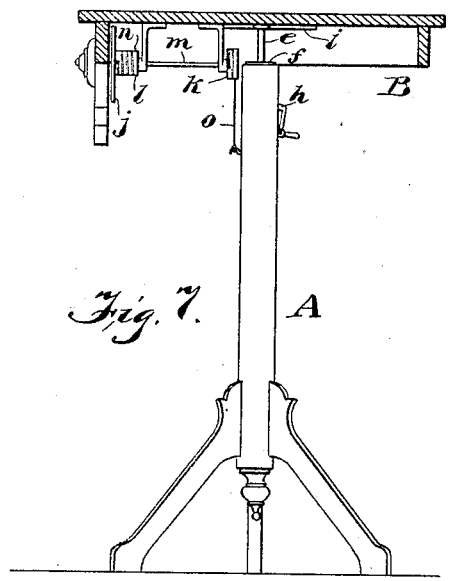

Figure 1 is a perspective view of a weighing-chair embodying my invention, showing the method of weighing a person. Fig. 2 is an enlarged view of a chair-arm and support, partly in section, disclosing the recording mechanism in elevation. Fig. 3 is a plan view of the chair-arm, showing the index by which the recorded weight is read. Fig. 4 is a view in elevation of my weighing device in the form of a stand or table in which the dial and index are exposed on the apron of same, the dial being stationary. Fig. 5 is a side view of same, partly in section, the same being taken on the line 5 5 of Fig. 4. Fig. 6 is a similar view to Fig. 4, the dial and index being placed behind the apron with the index stationary. Fig. 7 is a side view of same, partly in section, taken on the line 7 7 of Fig. 6. Fig. 8 is a sectional detail view of the pillar or base, showing one form of spring-balance to be used in my weighing device. Fig. 9 is a view in elevation of one form of recording device in a normal position, and Fig. 10 is a similar view showing the method of releasing the dial after a given weight has been recorded.

Referring to the drawings, A indicates the base, stand, or support of the weighing device, preferably, but not necessarily, formed of a hollow or chambered pillar, having inserted in an aperture $a$ a spiral spring $b$, the upper end of which is formed into an oval or elongated loop $b'$, thus giving a supporting-surface which bears on the upper surface of the pillar. One-half of the last convolution of the spring $b$ is made straight, as shown at $b''$, Fig. 8, to which is attached a link $c$, and suspended from said link is another spiral spring, $d$, of less tension than the spring $b$. The lower end of the spring $d$ is made fast by suitable means to a stem or square rod $e$, which is passed through the spring-coils and guide or bearing plates $f$ and $g$, Figs. 4 and 8, provided with friction-rollers $f'$ and $g'$, respectively. One side of the rod $e$, as shown in Fig. 8, is notched for a considerable portion of its length, forming a catch $e'$.

When it is not found desirable to weigh anything less than a pound, the spring $b$ only may be used, and in this case the catch $e'$ is permitted to rest on the spring $b$ at $b''$. When it is desired to weigh objects of a pound or less, a detent $h$ is pressed into the path of the spring $b$, thus holding it in its normal position while the spring $d$ is brought into action. On the upper end of the rod $e$ is secured a suitable bearing-plate $i$, to which is secured a platform or like device B, (see Figs. 4 to 7, inclusive,) upon which the person or object to be weighed is placed. Upon some suitable part of the platform B is secured the recording mechanism, consisting in one form of my invention of a disk $j$, mounted upon a shaft $m$ and having on its periphery or one side suitable graduations indicating pounds and fractions thereof. A drum $l$ is also mounted on the shaft $m$, and a cord or like flexible connection $n$ is given one or more turns around the drum and made fast thereto. The free end of the cord terminates in a coil-spring $n'$, made fast to some portion of the platform B. To another drum, $k$, which is also securely mounted upon the shaft $m$, is attached a cord or like flexible connection $o$, which is given one or more turns around the drum, and the free end is then made fast by some suitable means to the base A.

In Fig. 8 the platform B and parts supported thereby are omitted, the general structure being shown in Figs. 4 to 7, inclusive, and as already described.

The operation of the weighing device is as follows: When all the parts are in their normal positions, an index $p$ will register with zero on the dial or disk and will be held in that position by reason of the upward pressure of the spring-coils in the base A and the downward draft of the cord $o$. When a weight is placed on the platform B, the latter is pressed downward, thus shortening the distance between the center of the shaft $m$ and the point where the cord $o$ is attached to the base A. As the tension on the cord is decreased the spring $n'$ revolves the disk $j$ or index $p$, through the medium of the drum $l$ and the shaft $m$, a distance proportionate to that to which the platform B is pressed, and in this way the disk $j$ or index $p$ indicates the weight of the object on the platform B.

It will be understood that the disk $j$ may be supplied with another series of differently-spaced graduations for effecting registrations when weighing with the weaker spring $d$.

It is sometimes found desirable to remove the weight from the platform B before reading the indicator, and to accomplish this I provide in some instances a ratchet 2, as shown in Figs. 9 and 10, to be mounted on the shaft $m$ and which is prevented from returning to its normal position while a pawl 3 is in engagement therewith. In this form of indicator the cord $n$ and the cord $o$ are both wound on the drum $k'$, but in opposite directions, and the drum is loosely mounted on the shaft $m$. Upon the drum $l'$ is wound one end of a spring $r$, the other end being fastened to the frame of the platform B. Upon the drums $k'$ and $l'$ are formed lugs or ears 8 and 9, respectively, that move in the same path and serve as a clutch. Fulcrumed at 4 is a long-shanked pawl 3, near the lower end of which is pivoted an arm 5, the opposite end of the arm resting in a slotted guide 6. The pawl 3 is normally held in engagement with the ratchet 2 through the tension of a spring 7. When it is desired to release the ratchet, the cord $o$ is drawn down until the drum $k'$ is turned back far enough to allow the lug 9 to pass under and behind the catch 10. Then by releasing the tension on the cord $o$ the spring $n'$, which revolves the drum $k'$ in the opposite direction, will cause the lug 9 to bear against the catch 10, and thereby force the pawl 3 out of engagement, as shown in Fig. 10.

As shown in Figs. 4 to 7, inclusive, the scale-registering devices proper are supported by the platform B, said devices partaking bodily of the vertical movements of said platform. The pawl-and-ratchet devices shown in Figs. 9 and 10 are omitted from said Figs. 4 to 7 for the purpose of clearness of illustration.

The foregoing is an accurate description of my invention in its most practicable form; but I do not wish to be limited to the exact construction herein described, as slight changes may be made without departing from the spirit of my invention.

Having thus described my invention, I claim as new and desire to secure by Letters Patent—

1. A weighing-machine comprising a stand, a spring-controlled platform slidably mounted thereon, a scale and an indicator movable with the platform, a spring-controlled shaft for the indicator, and a cord connected to the shaft and stand and normally retaining the indicator at zero of the scale.

2. A weighing-machine comprising a stand, a spring-controlled platform slidably supported thereby, a scale and an indicator movable with the platform, a spring-controlled shaft for the indicator, and a normally taut flexible member between the shaft and stand, permitting the registering movement of the indicator under weight applied to the platform.

3. A weighing-machine comprising a stand, a platform, spring-supported on the said stand, and an indicator mounted on and moving bodily with the said platform, the indicator having a shaft, means for turning the shaft in one direction during the downward movement of the said platform and means for holding the shaft against return motion during the return movement of the platform.

4. A weighing-machine comprising a stand, a platform spring-supported on the said stand, and an indicator mounted on and moving bodily with the said platform, the indicator having a shaft, means for turning the shaft in one direction during the downward movement of the said platform, a drum mounted to turn loosely on the said shaft and on which wind cords in opposite directions, one of the cords being spring-pressed and the other cord fixed at its free end to the said stand, a ratchet-wheel secured on the said shaft, a pawl for engaging the said ratchet-wheel and hung on the said platform, a spring-pressed arm pivotally connected with the said pawl and having a shoulder, a lug turning with the said shaft and a lug turning with the said loose drum, the lugs being adapted to engage the said shoulder.

5. A weighing-machine provided with a support, a platform having a stem mounted to slide on the said support, a strong spring and a light spring coiled on the said stem and connected with each other at adjacent ends, the strong spring having its other end secured to the said support and the light spring being connected at its other end with the said stem, and a detent on the said support, adapted to engage the strong spring at the end connected with the light spring.

6. A weighing-machine provided with a support, a platform having a stem mounted to slide on the said support, and a strong spring and a light spring coiled on the said stem and connected with each other at adjacent ends, the strong spring having its other end secured to the said support and the light spring being connected at its other end with the said stem, the latter having a shoulder for engagement with the strong spring at the end connected with the light spring.

Signed at New York, N. Y., this 9th day of July, 1904.

ANTHONY G. WITEK.

Witnesses:
   FRANCIS DEDEK,
   JOSEPH E. MARKS.